(12) United States Patent
Chen et al.

(10) Patent No.: US 10,666,153 B2
(45) Date of Patent: May 26, 2020

(54) ACTIVE CLAMP FLYBACK CONVERTERS AND CONTROL METHODS THEREOF

(71) Applicant: Leadtrend Technology Corporation, Zhubei, Hsinchu County (TW)

(72) Inventors: Yao Tsung Chen, Zhubei (TW); Chih Chi Chang, Zhubei (TW); Meng Jen Tsai, Zhubei (TW)

(73) Assignee: LEADTREND TECHNOLOGY CORPORATION, Zhubei, Hsinchu County (TW)

( * ) Notice: Subject to any disclaimer, the term of this patent is extended or adjusted under 35 U.S.C. 154(b) by 0 days.

(21) Appl. No.: 16/549,063

(22) Filed: Aug. 23, 2019

(65) Prior Publication Data

US 2020/0106368 A1     Apr. 2, 2020

(30) Foreign Application Priority Data

Sep. 28, 2018   (TW) .............................. 107134308 A

(51) Int. Cl.
*H02M 3/335*     (2006.01)

(52) U.S. Cl.
CPC ... *H02M 3/33576* (2013.01); *H02M 3/33507* (2013.01)

(58) Field of Classification Search
CPC ............. H02M 3/335; H02M 3/33507; H02M 3/33523; H02M 3/33569; H02M 3/33576; H02M 3/33592
See application file for complete search history.

(56) References Cited

U.S. PATENT DOCUMENTS

| 7,609,533 | B2 * | 10/2009 | Chuang | H02M 3/33523 |
| | | | | 363/19 |
| 8,873,254 | B2 * | 10/2014 | Morris | H02M 3/335 |
| | | | | 363/21.14 |
| 2017/0070152 | A1 * | 3/2017 | Liu | H02M 3/33515 |
| 2017/0201182 | A1 * | 7/2017 | Tsou | H02M 3/33523 |
| 2018/0034378 | A1 * | 2/2018 | Lin | H02M 1/08 |
| 2019/0006957 | A1 * | 1/2019 | Ito | H02M 7/483 |

* cited by examiner

*Primary Examiner* — Matthew V Nguyen

(74) *Attorney, Agent, or Firm* — McClure, Qualey & Rodack, LLP

(57) ABSTRACT

A control method for a power convert is disclosed. The power convert uses an active-clamp flyback topology and has low-side and high-side switches. The low-side switch is switched to generate consecutive switching cycles including a modified flyback cycle and a normal flyback cycle. Each of the consecutive switching cycles is not less than a blanking time generated in response to a load of the power converter. The high-side switch is constantly turned OFF during the normal flyback cycle. The high-side switch is turned ON after the blanking time during the modified flyback cycle to perform zero-voltage switching for the low-side switch.

16 Claims, 6 Drawing Sheets

ACTIVE CLAMP FLYBACK CONVERTERS AND CONTROL METHODS THEREOF

CROSS-REFERENCE TO RELATED APPLICATION

This application claims priority to and the benefit of Taiwan Application Series Number 107134308 filed on Sep. 28, 2018, which is incorporated by reference in its entirety.

BACKGROUND

The present disclosure relates generally to power converters using an active-clamp flyback topology and control methods thereof, and, more particularly, to control methods that operates a power converter using an active-clamp flyback topology in one of several operation modes.

Flyback power converters have been widely adopted in the power supplies of home appliances, computers, battery chargers for example. To further improve the efficiency of a flyback power converter, an active-clamp topology has been introduced, using an active-clamp circuit to replace a snubber, which is commonly used to consume the energy stored by the leakage inductance of a primary winding of a transformer in the flyback power converter. A power converter using an active-clamp flyback topology is named an ACF power converter in short. ACF power converter is well known to have outstanding power efficiency when a load of the ACF power converter is heavy. However, the power efficiency deteriorates seriously when the load is light, substantially due to the significant circulated current continuously going back and forth through a primary winding of the ACF power converter.

Texas Instruments introduces UCC28780, a controller used in an ACF power converter. UCC28780 is capable of operating in one of four operation modes, basically in response to the state of the load of the ACF power converter. The circuit application datasheet of USCC28780, however, still shows a bleeder resistor connected in parallel with a capacitor of an active-clamp circuit, to slowly release the energy accumulated on the capacitor. Obviously, as the bleeder resistor acts as an energy eater, USCC28780 does completely employ the benefit of the active-clamp circuit.

Furthermore, system designers of conventional ACF power converters usually confront the difficulties in dealing with electromagnetic interference (EMI) and audible noise.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 1:
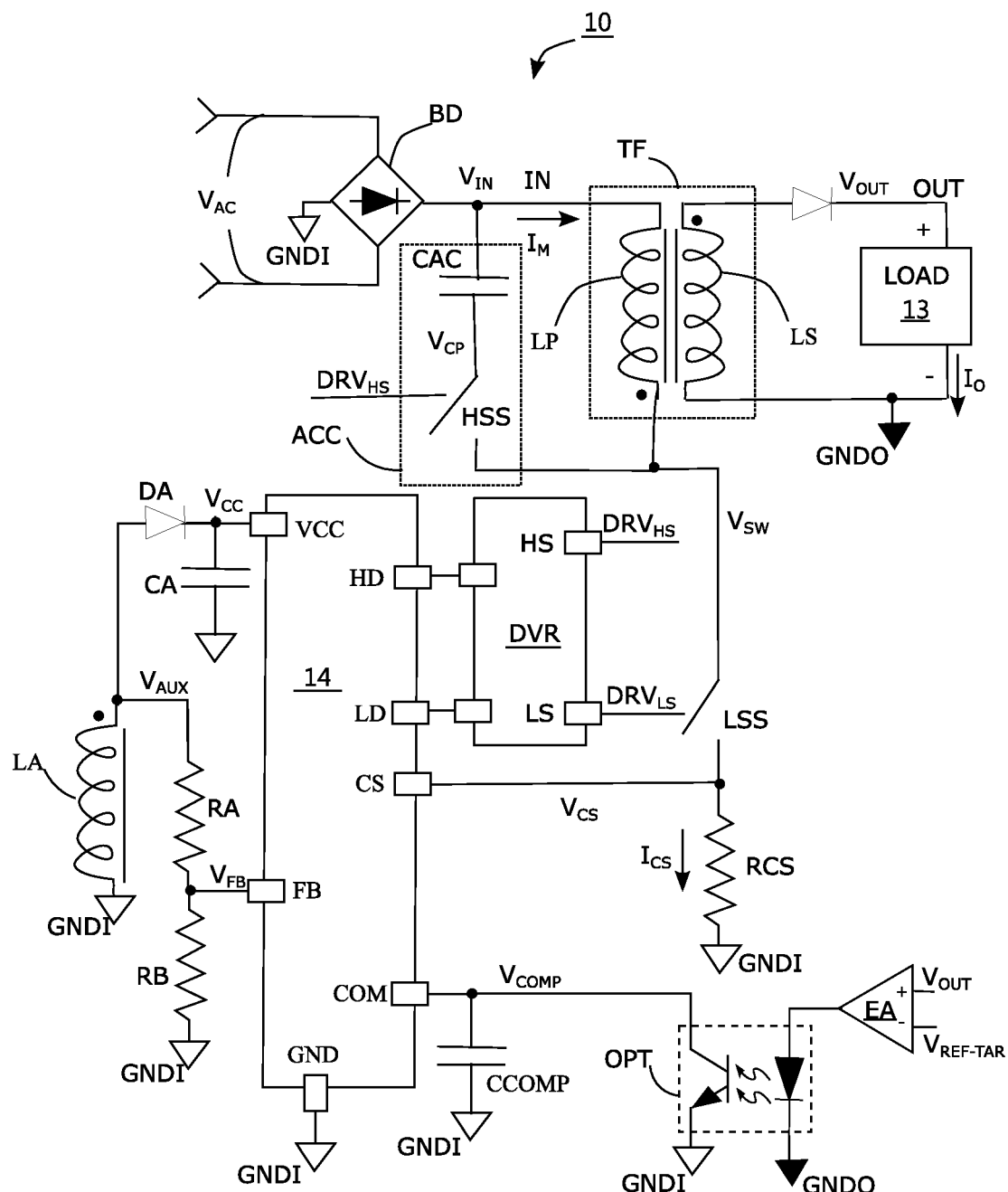
FIG. 1 shows ACF power converter 10 according embodiments of the invention.

FIG. 1 shows ACF power converter 10 according embodiments of the invention. Bridge rectifier BD performs full-wave rectification for alternating-current voltage $V_{AC}$ from a power grid, to provide input power lines IN and GNDI. Input voltage $V_{IN}$ at input power line IN is positive in reference to the voltage at input power line GNDI, which is referred to as input ground GNDI hereinafter. Transformer TF includes primary winding LP, secondary winding LS and auxiliary winding LA, inductively coupled to each other. Primary wilding LP, low-side switch LSS, and current-sense resistor RCS are connected in series between input power line IN and input ground GNDI. Low-side switch LSS and current-sense resistor connect primary wilding LP to input ground GNDI. Current-sense resistor RCS provides current-sense signal $V_{CS}$ to power controller 14, via current-sense pin CS. High-side switch HSS connects in series with capacitor CAC to form active-clamp circuit ACC, which connects in parallel with primary winding LP. When low-side switch LSS is turned ON, current-sense signal $V_{CS}$ is representative of inductor current $I_M$ flowing through primary winding LP.

Power controller 14, an integrated circuit in an embodiment, controls driver DVR, which could be another integrated circuit in one embodiment of the invention, to provide to high-side switch HSS and low-side switch LSS high-side signal $DRV_{HS}$ and low-side signal $DRV_{LS}$ respectively. High-side switch HSS and low-side switch LSS could be high-voltage GaN transistors or MOS transistors in some embodiments of the invention. In some embodiments of the invention, driver DVR, high-side switch HSS and low-side switch, individually manufactured, are all integrated into one integrated-circuit package. Power controller 14 and driver DVR, in combination, could act as a control circuit to provide high-side signal $DRV_{HS}$ and low-side signal $DRV_{HS}$, controlling high-side switch HSS and low-side switch LSS respectively.

By turning ON and OFF high-side switch HSS and low-side switch LSS, power controller 14 causes inductor current $I_M$ to vary, so that secondary winding LS reflectively generates alternating-current voltage, which is then rectified to provide output power lines OUT and GNDO. Output voltage $V_{OUT}$ at output power line OUT is positive in reference to the voltage at output power line GNDO, which is referred to as output ground GNDO hereinafter. Output voltage $V_{OUT}$ provides output current $I_o$ to charge or power load 13, a rechargeable battery for instance.

To regulate output voltage $V_{OUT}$, power controller 14 acquires negative feedback control from the combination of error amplifier EA, optical coupler OPT and compensation capacitor CCOMP. At the secondary side, error amplifier EA compares output voltage $V_{OUT}$ with target voltage $V_{REF-TAR}$, to control compensation signal $V_{COMP}$ on compensation capacitor CCOMP at the primary side, via optical coupler OPT that provides DC isolation between the primary and secondary sides. For example, when output voltage $V_{OUT}$ exceeds target voltage $V_{REF-TAR}$, compensation signal $V_{COMP}$ goes down and the power that ACF power converter 10 converts to load 13 reduces, so as to regulate output voltage $V_{OUT}$ about at target voltage $V_{REF-TAR}$.

AC voltage is induced across auxiliary winding LA at the primary side, and rectified to generate operating voltage $V_{CC}$ at power input pin VCC of power controller 14, where operating voltage $V_{CC}$ substantially supplies the power needed for the operation of power controller 14. Resisters RA and RB, connected in series, form a voltage-dividing circuit, and the joint between resisters RA and RB is connected to feedback pin FB of power controller 14. Feedback voltage $V_{FB}$ is at feedback pin FB.

Power controller 14 and driver DVR generate high-side signal $DRV_{HS}$ and low-side signal $DRV_{LS}$ in response to current-sense signal $V_{CS}$, compensation signal $V_{COMP}$ and feedback voltage $V_{FB}$.

Figure 2:
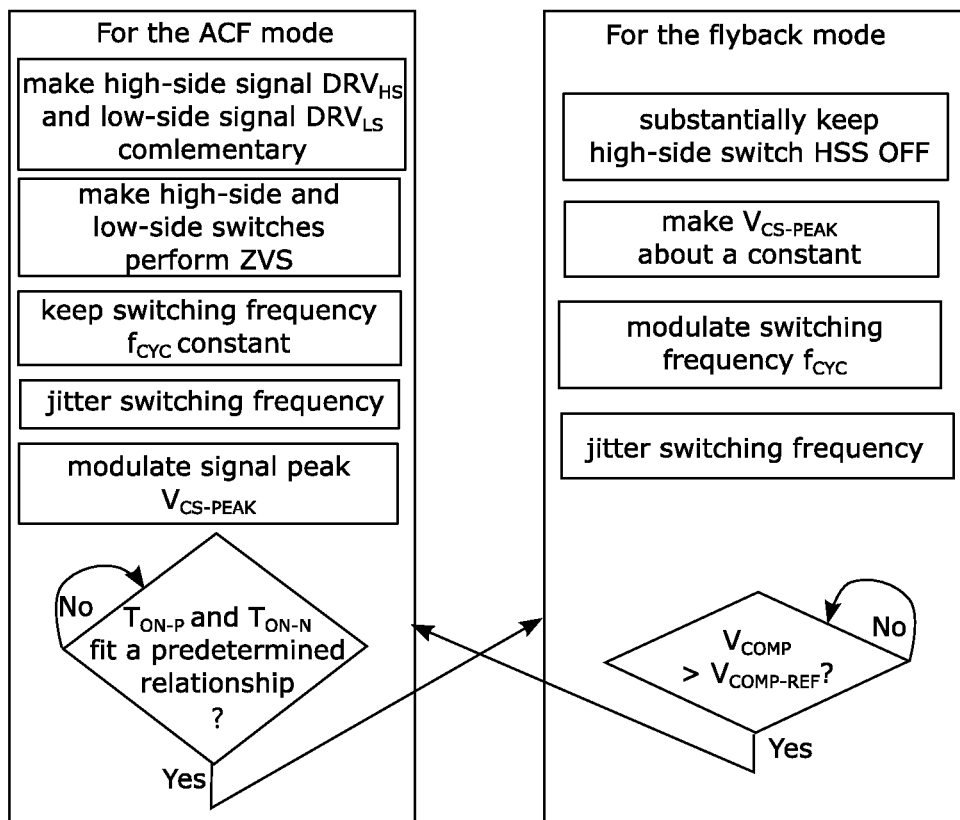
FIG. 2 demonstrates two operation modes, one called hereinafter the ACF mode and the other the flyback mode.

In one embodiment of the invention, power controller 14 adaptively switches to operate in one of two operation modes, but the invention is not limited to, however. In another embodiment of the invention, power controller 14 adaptively switches to operate in one of three operation modes. FIG. 2 demonstrates two operation modes, one called hereinafter the ACF mode and the other the flyback mode. Generally speaking, the ACF mode is used when load 13 is in a heavy state, and the flyback mode is used when load 13 is in a light state or there is no load.

As demonstrated in FIG. 2, when operated in the ACF mode, power controller 14 is configured to perform: 1) making high-side signal $DRV_{HS}$ and low-side signal $DRV_{LS}$ substantially complementary to each other, and high-side switch HSS and low-side switch LSS perform ZVS; 2) fixing but jittering switching frequency $f_{CYC}$; and 3) modulating signal peak $V_{CS-PEAK}$ in response to compensation signal $V_{COMP}$, where signal peak $V_{CS-PEAK}$ is a local maximum of current-sense signal $V_{CS}$ and will be detailed later. Power controller 14, when operated in the ACF mode, checks whether positive-current duration $T_{ON-P}$ and negative-current duration $T_{ON-N}$ fit a predetermined relationship to exit the ACF mode and enter the flyback mode. Positive-current duration $T_{ON-P}$ and negative-current duration $T_{ON-N}$ represent durations when current-sense signal $V_{CS}$ is positive and negative respectively, especially when low-side switch LSS is turned ON.

In comparison with compensation signal $V_{COMP}$, a predetermined relationship between positive-current duration $T_{ON-P}$ and negative-current duration $T_{ON-N}$ could be more suitable to indicate the state of load 13 when power controller 14 is operated in the ACF mode, and could be used as an indicator to switch operation modes.

When operated in the flyback mode, power controller 14 is configured to perform: 1) keeping high-side switch HSS substantially turned OFF; 2) making signal peak $V_{CS-PEAK}$ about a constant; and 3) modulating and jittering switching frequency $f_{CYC}$ in response to compensation $V_{COMP}$ Meanwhile, power controller 14 monitors whether the compensation signal $V_{COMP}$ exceeds a reference voltage $V_{COMP-REF}$, to exit the flyback mode and enter the ACF mode.

Figure 3A:
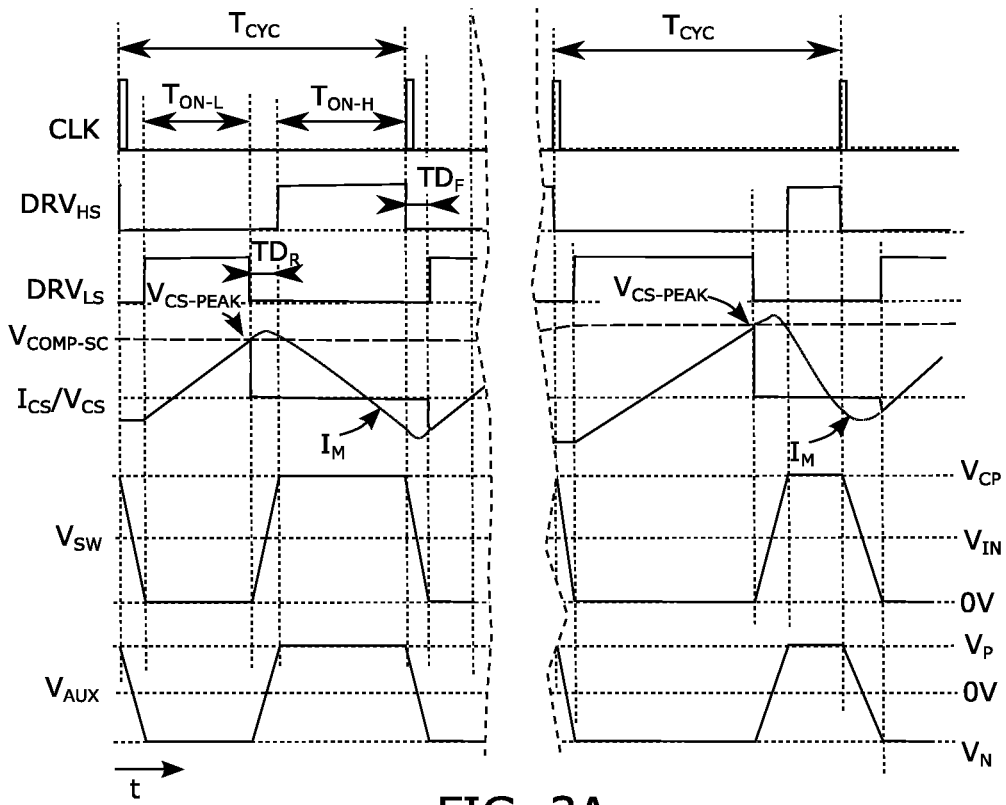
FIG. 3A shows some signal waveforms when ACF power converter 10 is operated in the ACF mode.

Please refer to FIGS. 2 and 3A, where FIG. 3A shows some signal waveforms when ACF power converter 10 is operated in the ACF mode. From top to bottom, signal waveforms in FIG. 3A are clock signal CLK internally generated by power controller 14, high-side signal $DRV_{HS}$, low-side signal $DRV_{LS}$, current-sense signal $V_{CS}$, terminal voltage $V_{SW}$ at the joint between high-side switch HSS and low-side switch LSS, and winding voltage $V_{AUX}$ across auxiliary winding LA.

Power controller 14 has in itself a clock generator to provide clock signal CLK, capable of defining switching cycle $T_{CYC}$, the reciprocal of which is switching frequency $f_{CYC}$ of low-side signal $DRV_{LS}$.

When power controller 14 is operated in the ACF mode, switching frequency $f_{CYC}$ is about a constant independent from compensation signal $V_{COMP}$, and might optionally be jittered. For example, during the time when power controller 14 is operated in the ACF mode, switching frequency $f_{CYC}$ is independent from compensation signal $V_{COMP}$, centers at 200 kHz and varies periodically between 190 kHz and 210 kHz with a jittering frequency of 400 Hz, capable of solving electromagnetic interference (EMI) issues.

When operated in the ACF mode, power controller 14 makes high-side signal $DRV_{HS}$ and low-side signal $DRV_{LS}$ substantially complementary, as demonstrated by the waveforms in FIG. 3A. The ACF mode is a complementary mode, therefore. When high-side signal $DRV_{HS}$ turns from logic "1" to logic "0", dead time $TD_F$ follows and then low-side signal $DRV_{LS}$ complementarily turns from logic "0" to logic "1". Similarly, when low-side signal $DRV_{LS}$ turns from logic "1" to logic "0", dead time $TD_R$ follows and then high-side signal $DRV_{HS}$ complementarily turns from logic "0" to logic "1".

Dead times $TD_F$ and $TD_R$ are short but necessary. Their existence prevents the short through happening when both high-side switch HSS and low-side switch LSS are turned ON at the same time, and also helps high-side switch HSS and low-side switch LSS both to perform zero-voltage switching (ZVS). It is known in the art that low-side signal $DRV_{LS}$ and high-side signal $DRV_{HS}$ are substantially complementary to each other even though they both are "0" in logic briefly during dead times $TD_F$ and $TD_R$. For example, when low-side signal $DRV_{LS}$ turns from logic "1" into logic "0", winding voltage $V_{AUX}$ raises from a negative voltage $V_N$ and approaches to a positive voltage $V_P$, while terminal voltage $V_{SW}$ raises from 0V to approach voltage $V_{CP}$, as shown in FIG. 3A. Voltage $V_{CP}$ is the voltage at the joint between high-side switch HSS and capacitor CAC. Power controller 14 senses winding voltage $V_{AUX}$ by detecting feedback voltage $V_{FB}$. Once it is found that winding voltage $V_{AUX}$ is about the positive voltage $V_P$, it can be determined that terminal voltage $V_{SW}$ is about voltage $V_{CP}$, and accordingly power controller 14 changes high-side signal $DRV_{HS}$ from "0" into "1" in logic, performing ZVS at high-side switch HSS. Similarly, when high-side signal $DRV_{HS}$ turns from logic "1" into logic "0", power controller 14 could detect winding voltage $V_{AUX}$ to know whether terminal voltage $V_{SW}$ drops to be about 0V, and when it is determined that the terminal voltage $V_{SW}$ is about 0V, changes low-side signal $DRV_{LS}$ from "0" into "1" in logic, performing ZVS at low-side switch LSS.

Low-side ON time $T_{ON-L}$ refers to the period of time when low-side signal $DRV_{LS}$ is "1" in logic, or the period of time when low-side switch LSS conducts current. Analogously, high-side ON time $T_{ON-H}$ is the period of time when high-side signal $DRV_{HS}$ is "1" in logic, or the period of time when high-side switch HSS conducts current.

FIG. 3A also shows how power controller 14 modulates signal peak $V_{CS-PEAK}$. In FIG. 3A attenuated compensation signal $V_{COMP-SC}$ is in a linear correlation with compensation signal $V_{COMP}$. For example, $V_{COMP-SC}=K*V_{COMP}$, where K is a constant between 0 and 1. A voltage divider comprising resistors connected in series, for example, divides compensation signal $V_{COMP}$ to generate attenuated compensation signal $V_{COMP-SC}$. Attenuated compensation signal $V_{COMP-SC}$ controls signal peak $V_{CS-PEAK}$. During low-side ON time $T_{ON-L}$, current-sense signal $V_{CS}$ increases over time, and when determining that current-sense signal $V_{CS}$ exceeds attenuated compensation signal $V_{COMP-SC}$, power controller 14 ends low-side ON time $T_{ON-L}$ and, further after a delay of dead time $TD_R$, starts high-side ON time $T_{ON-H}$. During dead time $TD_R$, current-sense signal $V_{CS}$ drops, and the local maximum of current-sense signal $V_{CS}$ becomes signal peak $V_{CS-PEAK}$, which is about attenuated compensation signal $V_{COMP-SC}$, as shown in FIG. 3A. Accordingly, power controller 14 modulates signal peak $V_{CS-PEAK}$ in response to compensation signal $V_{COMP}$ In comparison with the switching cycle at the left portion of FIG. 3A, the one at the right portion or FIG. 3A has a larger attenuated compensation $V_{COMP-SC}$, so signal peak $V_{CS-PEAK}$ is larger in the right portion or FIG. 3A. In other words, power controller 14 makes signal peak $V_{CS-PEAK}$ in a linear correlation with compensation signal $V_{COMP}$.

A switching cycle $T_{CYC}$ shown in FIG. 3A consists of dead time $TD_F$, low-side ON time $T_{ON-L}$, dead time $TD_R$ and high-side ON time $T_{ON-H}$. A pulse of clock signal CLK ends high-side ON time $T_{ON-H}$ and starts dead time $TD_F$, which ends at about the moment when terminal voltage $V_{SW}$ is 0V. Low-side ON time $T_{ON-L}$ follows dead time $TD_F$, and ends when current-sense signal $V_{CS}$ exceeds attenuated compensation signal $V_{COMP-SC}$ Dead time $TD_R$ follows low-side ON time $T_{ON-L}$, and ends when terminal voltage $V_{SW}$ is about voltage $V_{CP}$, to start high-side ON time $T_{ON-H}$ A next pulse of clock signal CLK ends high-side ON time $T_{ON-H}$ and also concludes a switching cycle $T_{CYC}$.

When operated at the ACF mode, inductor current $I_M$ flowing through primary winding LP does not stop at 0A, always changing.

Figure 3B:
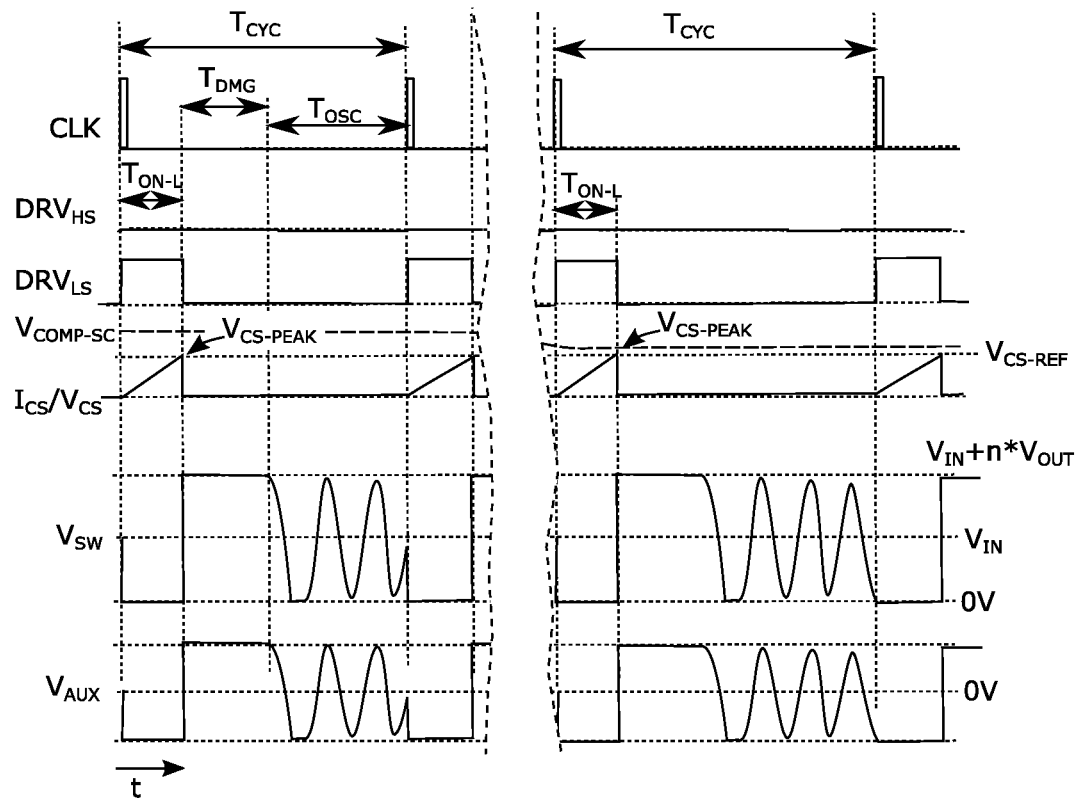
FIG. 3B shows some signal waveforms when ACF power converter 10 is operated in the flyback mode.

Please refer to FIGS. 2 and 3B, where FIG. 3B shows some signal waveforms when ACF power converter 10 is operated in the flyback mode. From top to bottom, signal waveforms in FIG. 3B are clock signal CLK, high-side signal $DRV_{HS}$, low-side signal $DRV_{HS}$, current-sense signal $V_{CS}$, terminal voltage $V_{SW}$, and winding voltage $V_{AUX}$.

As shown in FIG. 3B, when operated in the flyback mode, high-side signal $DRV_{HS}$ is substantially kept as "0" in logic to turn high-side switch HSS OFF, and low-side signal $DRV_{LS}$ periodically switches low-side switch LSS. The flyback mode is a non-complementary mode because high-side signal $DRV_{LS}$ and low-side signal $DRV_{LS}$ are not complementary to each other, obviously.

Shown in FIG. 3B, a pulse of clock signal CLK starts a switching cycle $T_{CYC}$ and low-side ON time $T_{ON-L}$ as well. When current-sense signal $V_{CS}$ exceeds a constant reference voltage $V_{CS-REF}$, low-side ON time $T_{ON-L}$ ends and demagnetization time $T_{DMA}$ starts. Reference voltage $V_{CS-REF}$ is independent to compensation signal $V_{COMP}$ During demagnetization time $T_{DMA}$, secondary winding LS releases energy to build up output voltage $V_{OUT}$. Demagnetization time $T_{DMA}$ comes to an end when secondary winding LS completely depletes the energy it carries, so terminal voltage $V_{SW}$ starts oscillating, and oscillation time $T_{OSC}$ begins, as shown in FIG. 3B. A next pulse of clock signal CLK concludes both oscillation time $T_{OSC}$ and a switching cycle $T_{CYC}$. When operated in the flyback cycle, a switching cycle time $T_{CYC}$ consists of low-side ON time $T_{ON-L}$, demagnetization time $T_{DMA}$ and oscillation time $T_{OSC}$.

In FIG. 3B, when operated in the flyback mode, peak signal $V_{CS-PEAK}$ is independent to the variation of attenuated compensation signal $V_{COMP-SC}$ or compensation signal $V_{COMP}$, and is about a constant substantially equal to reference voltage $V_{CS-REF}$.

When operated in the flyback mode, the clock generator providing clock signal CLK is controlled by compensation signal $V_{COMP}$ By comparing the left and the right portions of FIG. 3B, it can be found that the lower attenuated compensation signal $V_{COMP-SC}$ the longer switching cycle $T_{CYC}$.

When power controller 14 is operated in the flyback mode, switching frequency $f_{CYC}$, the reciprocal of switching cycle $T_{CYC}$, depends on compensation signal $V_{COMP}$, and might optionally be jittered to solve EMI issues. For example, during the time when power controller 14 is operated in the flyback mode, switching frequency $f_{CYC}$ centers at an average frequency and varies periodically between upper and lower frequencies, where the average frequency is a function of compensation signal $V_{COMP}$.

Even though FIG. 3B shows that high-side switch HSS is constantly turned OFF, the invention is not limited to however. In another embodiment of the invention, when power controller 14 is operated in the flyback mode, high-side switch HSS is not turned ON during low-side ON time $T_{ON\_L}$ and demagnetization time $T_{DMA}$, but is briefly turned ON in a period of time within oscillation time $T_{OSC}$, to release some electric energy stored in capacitor CAC.

The flyback mode is a discontinuous conduction mode (DCM), because inductor current $I_M$ flowing through primary winding LP stays at 0A sometimes.

When operated in the flyback mode, if power controller 14 determines that compensation signal $V_{COMP}$ exceeds a reference voltage $V_{COMP-REF}$ power controller 14 exits the flyback mode and enters the ACF mode.

Figure 4:
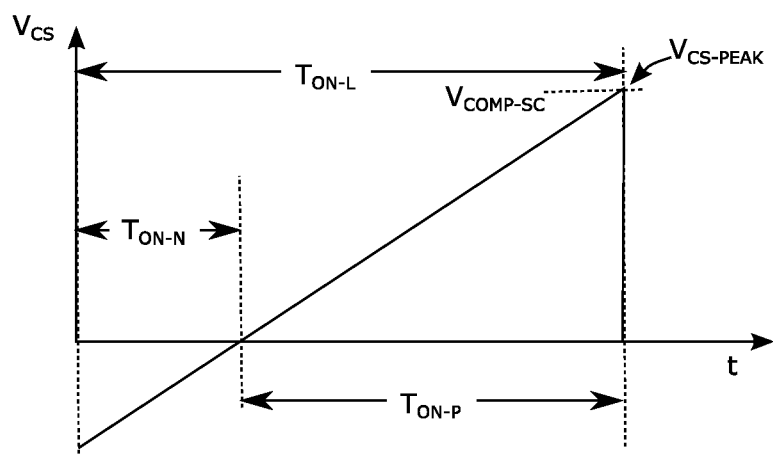
FIG. 4 enlarges the waveform of current-sense signal $V_{CS}$ during low-side ON time $T_{ON-L}$.

FIG. 4 enlarges the waveform of current-sense signal $V_{CS}$ during low-side ON time $T_{ON-L}$. When operated in the ACF mode, inductor current $I_M$ through primary winding LP might be negative at the beginning of low-side ON time $T_{ON\_L}$, so current-sense signal $V_{CS}$ is negative in that beginning. During low-side ON time $T_{ON\_L}$, as input voltage $V_{IN}$ constantly increases the magnetic energy stored by primary winding LP, current-sense signal $V_{CS}$ increases linearly over time until current-sense signal $V_{CS}$ exceeds attenuated compensation signal $V_{COMP-SC}$ Shown in FIG. 4, negative-current duration $T_{ON-N}$ refers to the period of time when current-sense signal $V_{CS}$ is negative, and positive-current duration $T_{ON-P}$ the period of time when it is positive.

Only if positive-current duration $T_{ON-P}$ is longer than negative-current duration $T_{ON-N}$, ACF power converter 10 is transferring and supplying energy to output voltage $V_{OUT}$. From another perspective of view, if positive-current duration $T_{ON-P}$ is very close to negative-current duration $T_{ON-N}$ and the compensation signal $V_{COMP}$ stays unchanged, it implies that load 13 is not heavy anymore, and should be a middle load or a light load.

It can be found from FIG. 4 that compensation signal $V_{COMP}$ or attenuated compensation signal $V_{COMP-SC}$, which are usually used to indicate the status of load 13, cannot represent the status of load 13 anymore, basically due to the existence of negative-current duration $T_{ON-N}$. Therefore, it is a better choice to select positive-current duration $T_{ON-P}$ and negative-current duration $T_{ON-N}$ as indicators, instead of compensation signal $V_{COMP}$, for determining whether to exit the ACF mode.

As shown in FIG. 2, in one embodiment of the invention, power controller 14 checks whether positive-current duration $T_{ON-P}$ and negative-current duration $T_{ON-N}$ have a predetermined relationship therebetween, to exit the ACF mode and enter the flyback mode. For example, when $T_{ON-P} < T_{ON-N} + K_T$, power controller 14 exits the ACF mode and enters the flyback mode, where $K_T$ is a positive constant. The predetermined relationship is not limited to the comparison between positive-current duration $T_{ON-P}$ and negative-current duration $T_{ON-N}$. In another embodiment of the invention, for example, power controller 14 checks energization duty cycle $D_{ON-P}$, referring to $T_{ON-P}/(T_{ON-P}+T_{ON-N})$, to see if it is smaller than a predetermined value, so as to exit the ACF mode and enter the flyback mode.

In one embodiment of the invention, power controller 14 exits the ACF mode and enters the flyback mode right after the switching cycle in which positive-current duration $T_{ON-P}$ and negative-current duration $T_{ON-N}$ are found to have the predetermined relationship, but this invention is not limited to. In another embodiment of the invention, power controller 14 delays to exit the ACF mode and enter the flyback mode until positive-current duration $T_{ON-P}$ and negative-current duration $T_{ON-N}$ have continuously been found to have the predetermined relationship for a predetermined time period, 1 ms for example. This delay is especially beneficial during the test of load transient response. Supposedly this delay is 1 ms, and, under a test of load transient response, the status when load 13 is a light load does not last more than 1 ms before load 13 switches to become a heavy load. Under this test of load transient response, power controller 14 will continue to be operated in the ACF mode when load 13 briefly changes into a light load, and ACF power converter 10 expectedly has better transient response and more stable output voltage $V_{OUT}$.

Figure 5A:
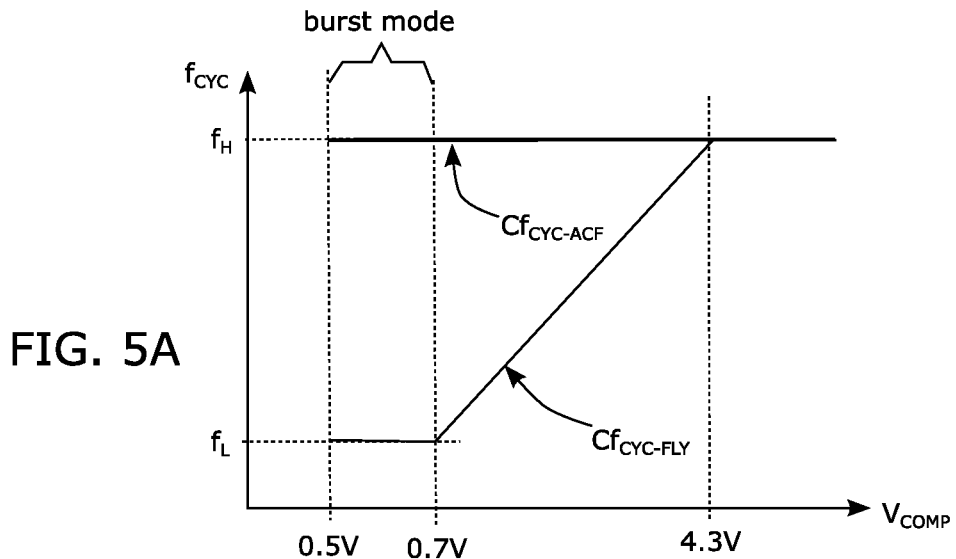
FIG. 5A shows the relationship between switching frequency $f_{CYC}$ and compensation signal $V_{COMP}$.

FIG. 5A shows the relationship between switching frequency $f_{CYC}$ and compensation signal $V_{COMP}$ for ACF power converter 10. When operated in the ACF mode and in the flyback back, the relationship is demonstrated by curves $Cf_{CYC-ACF}$ and $Cf_{CYC-FLY}$, respectively. Curve $Cf_{CYC-ACF}$ clearly shows that switching frequency $f_{CYC}$ is a constant $f_H$ when operated in the ACF mode, and is independent from compensation signal $V_{COMP}$. Curve $Cf_{CYC-FLY}$ shows that when compensation signal $V_{COMP}$ is between 4.3V and 0.7V switching frequency $f_{CYC}$ and compensation signal $V_{COMP}$ have a positive linear correlation with each other, meaning switching frequency $f_{CYC}$ increases linearly as compensation signal $V_{COMP}$ increases. In case the embodiment in FIG. 1 has a function of frequency jittering, curves $Cf_{CYC-ACF}$ and $Cf_{CYC-FLY}$ represent averages of switching frequency $f_{CYC}$ when it is jittered during the ACF mode and the flyback mode respectively.

It is also shown in FIG. 5A that power controller 14 is operated in a burst mode when compensation signal $V_{COMP}$ is around 0.5V, no matter which operation mode it was operated in previously. The burst mode can reduce the switching loss of high-side switch HSS and low-side switch LSS, and possibly increases the power conversion efficiency when supplying power to a light load or no load. If output current $I_o$ is positive but very little, compensation signal $V_{COMP}$ could go below 0.5V, causing power controller 14 to constantly turn OFF high-side switch HSS and low-side switch LSS and resulting in switching frequency $f_{CYC}$ equal to 0, no power conversion at all. As power conversion pauses while output current $I_o$ continues, output voltage $V_{OUT}$ decreases and compensation signal $V_{COMP}$ will go upward over time. Once compensation signal $V_{COMP}$ exceeds 0.7V, power controller 14 resumes to operate in the flyback mode or the ACF mode that it was operated in before the power conversion paused, supplying power to output voltage $V_{OUT}$. If output current $I_o$ is still so little that the energy the ACF power converter 10 supplies to output voltage $V_{OUT}$ exceeds the energy that load 13 consumes, output voltage $V_{OUT}$ will go upward and compensation signal $V_{COMP}$ eventually will go below 0.5V again, causing power conversion to pause once again. Therefore, if load 13 is always little, switching frequency $f_{CYC}$ will alternate between being 0 Hz for a period of time and being non-zero Hz for another period of time. This kind of operation mode is known as a burst mode.

Figure 5B:
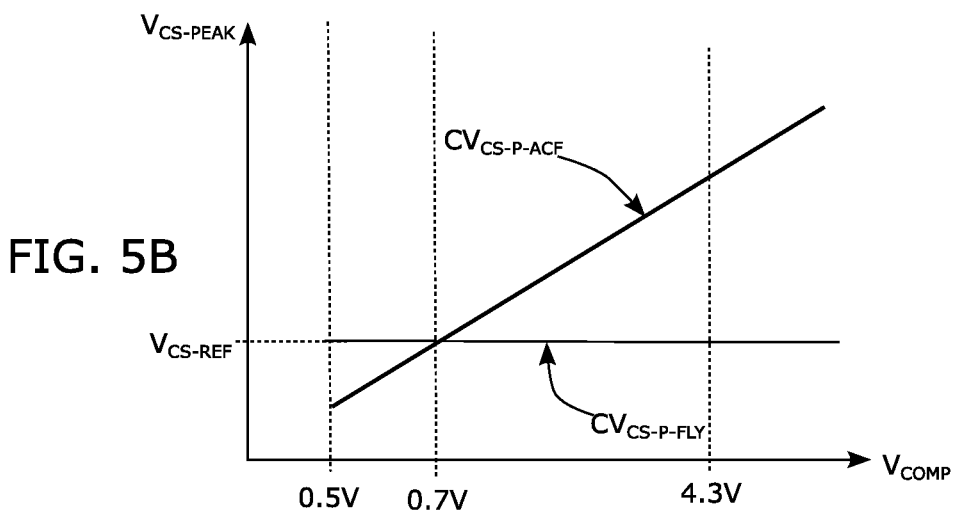
FIG. 5B demonstrates the relationship between signal peak $V_{CS-PEAK}$ and compensation signal $V_{COMP}$ regarding to the embodiment of FIG. 1.

FIG. 5B demonstrates the relationship between signal peak $V_{CS-PEAK}$ and compensation signal $V_{COMP}$ regarding to the embodiment of FIG. 1. When operated in the ACF mode, signal peak $V_{CS-PEAK}$ and compensation signal $V_{COMP}$ have a relationship shown by curve $CV_{CS-P-ACF}$; when operated in the flyback mode, they have a relationship shown by curve $CV_{CS-P-FLY}$. Curve $CV_{CS-P-ACF}$ indicates a positive, linear correlation between signal peak $V_{CS-PEAK}$ and compensation signal $V_{COMP}$, the higher compensation signal $V_{COMP}$ the higher signal peak $V_{CS-PEAK}$. Curve $CV_{CS-P-FLY}$ indicates signal peak $V_{CS-PEAK}$ as a constant $V_{CS-REF}$ independent from compensation signal $V_{COMP}$.

Figure 5C:
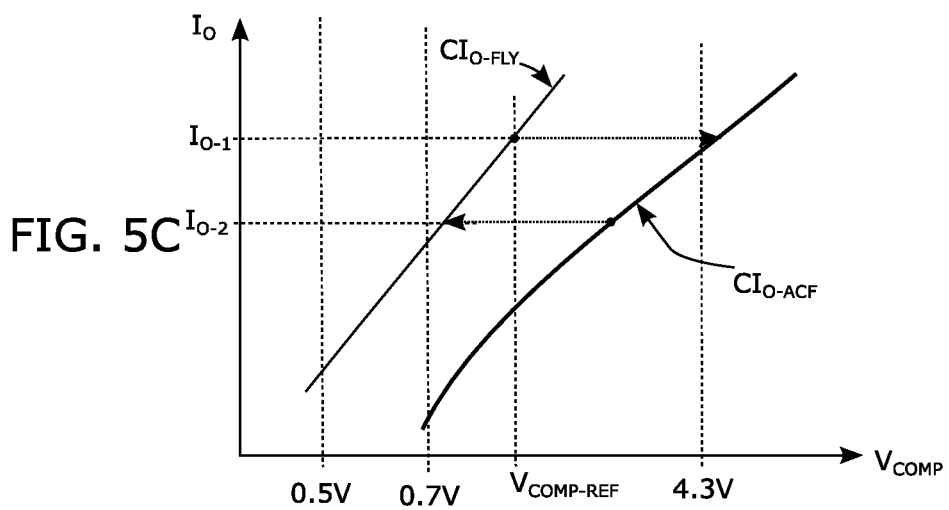
FIG. 5C demonstrates the graph of current $I_o$ vs compensation signal $V_{COMP}$ when the embodiment of FIG. 1 stays on a steady state, and the mode switching between the ACF mode and the flyback mode as well.

FIG. 5C demonstrates the graph of current $I_0$ vs compensation signal $V_{COMP}$ when the embodiment of FIG. 1 stays on a steady state, and the mode switching between the ACF mode and the flyback mode as well. When operated in the ACF mode, the relationship between output current $I_0$ and compensation signal $V_{COMP}$ is represented by curve $CI_{O-ACF}$; when operated in the flyback mode, it is represented by curve $CI_{O-FLY}$. It is supposed that output current $I_0$ of ACF power converter 10 is initially below reference current $I_{o-2}$, and, according to FIG. 5C, power controller 14 should be operated in the flyback mode. When output current $I_0$ varies, compensation signal $V_{COMP}$ changes accordingly, following curve $CI_{O-FLY}$. In case that output current $I^o$ steadily increases to exceed reference current $I_{o-1}$, power controller 14 determines that compensation signal $V_{COMP}$ is larger than reference voltage $V_{COMP-REF}$, so it exits the flyback mode and enters the ACF mode. Once it enters the ACF mode, compensation signal $V_{COMP}$ increases dramatically to approach to the value corresponding to reference current $I_{o-1}$ on curve $CI_{O-ACF}$. Now when output current $I_0$ varies, compensation signal $V_{COMP}$ changes accordingly, following curve $CI_{O-ACF}$. In case that power controller 14 determines that positive-current duration $T_{ON-P}$ and negative-current duration $T_{ON-N}$ have reached the predetermined relationship, output current $I_O$ is about reference current $I_{o-2}$, and power controller 14 exits the ACF mode to enter the flyback mode. Due to the operation mode switching from the ACF mode to the flyback mode, compensation signal $V_{COMP}$ decreases dramatically to approach to the value corresponding to reference current $I_{o-2}$ on curve $CI_{O-FLY}$.

Figure 6:
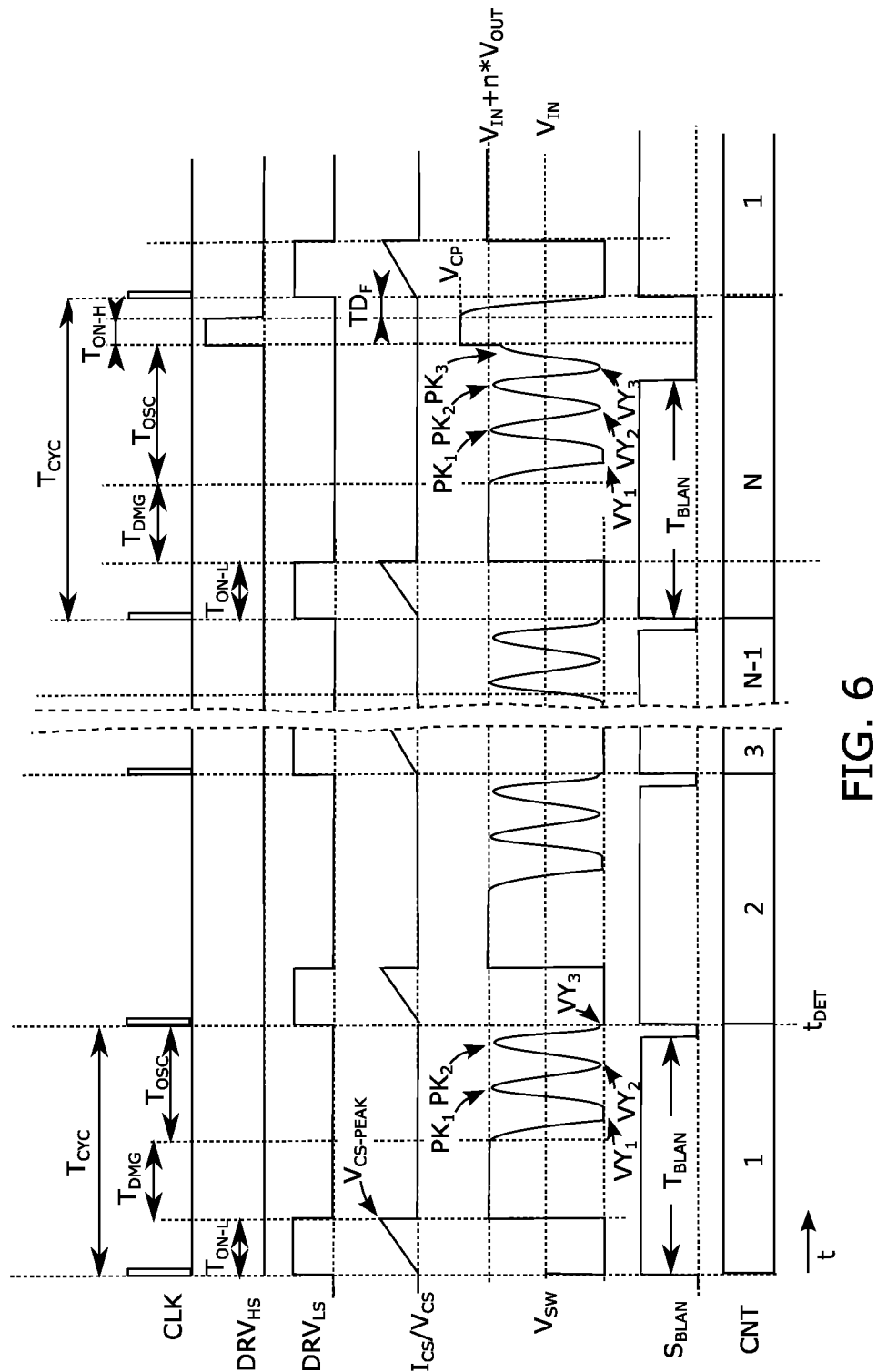
FIG. 6 demonstrates consecutive switching cycles $T_{CYC}$ when ACF power converter 10 in FIG. 1 is operated in the flyback mode.

FIG. 6 demonstrates consecutive switching cycles $T_{CYC}$ when ACF power converter 10 in FIG. 1 is operated in the flyback mode. As shown in FIG. 6, low-side signal $DRV_{LS}$ switches low-side switch LSS to continuously and periodically generate N switching cycles $T_{CYC}$, where N is 8 for example, an integer bigger than 1.

The waveforms in FIG. 6 from top to bottom are clock signal CLK, high-side signal $DRV_{HS}$, low-side signal $DRV_{LS}$, current-sense signal $V_{CS}$, terminal voltage $V_{SW}$, blank signal $S_{BLAN}$, and count CNT.

Blank signal $S_{BLAN}$ generated internally in power controller 14 defines blanking time $T_{BLAN}$, which represents the minimum cycle time of the present switching cycle $T_{CYC}$. Only when blanking time $T_{BLAN}$ elapses, the current switching cycle $T_{CYC}$ can conclude and a next switching cycle $T_{CYC}$ can start. Blanking time $T_{BLAN}$ is determined by load 13 for example. In one embodiment, blanking time $T_{BLAN}$ is generated in response to compensation signal $V_{COMP}$, and the relationship of maximum frequency $f_{BLAN}$, the reciprocal of blanking time $T_{BLAN}$, versus compensation signal $V_{COMP}$ could be represented by curve $CF_{CYC-FLY}$ in FIG. 5A.

Power controller 14 could have a counter to record count CNT of the switching cycles $T_{CYC}$. When it is determined that N switching cycles $T_{CYC}$ have appeared, the counter is reset to make count CNT 1, as shown in FIG. 6, to restart count CNT.

Figure 7:
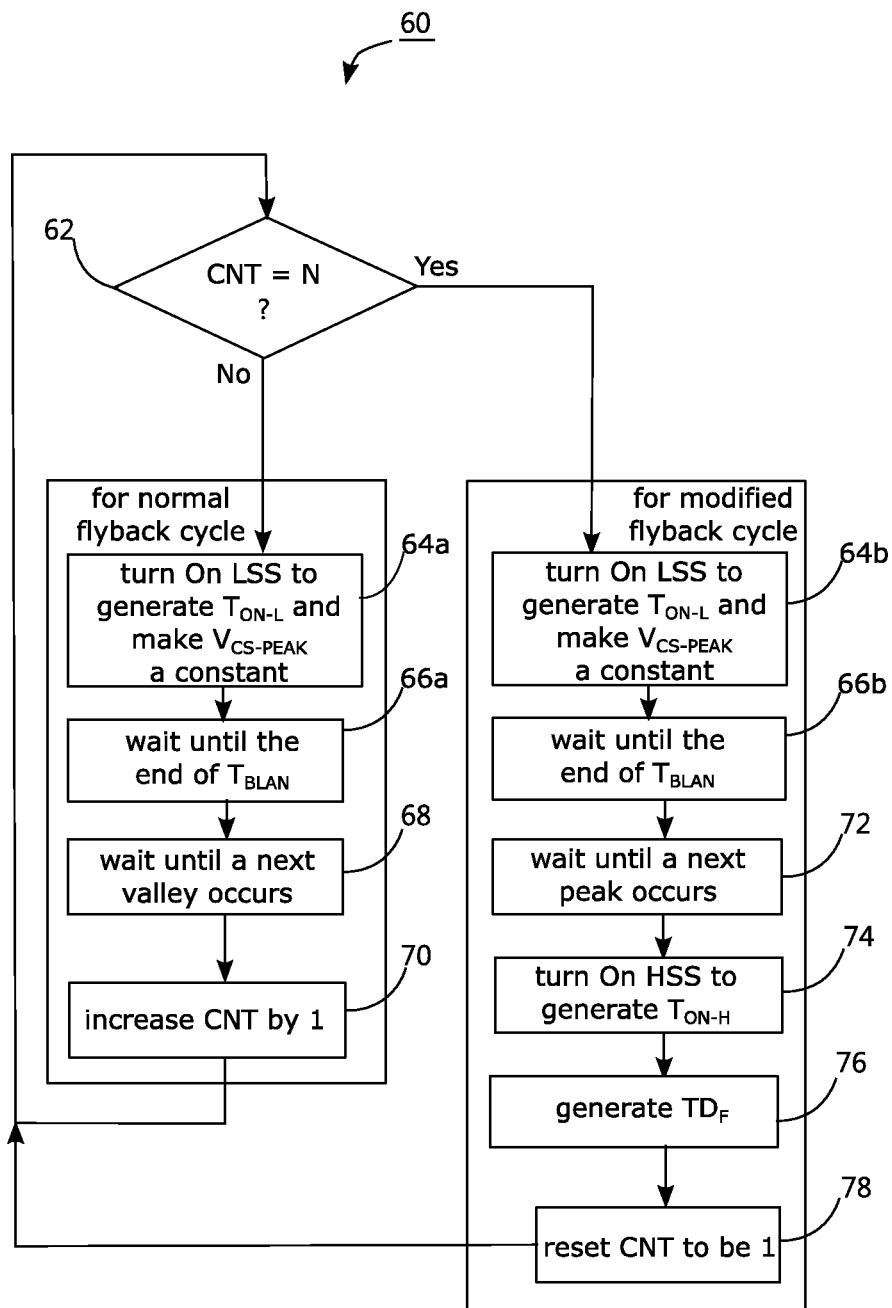
FIG. 7 demonstrates control method 60 in use of power controller 14.

FIG. 7 demonstrates control method 60 in use of power controller 14. When count CNT is smaller than N, meaning the current switching cycle must be one of the first N−1 switching cycles, step 62 of control method 60, which checks whether the count CNT is N, will generate a negative result, and control method 60 proceeds to steps for a normal flyback cycle. In other words, each of the first N−1 switching cycles is deemed as a normal flyback cycle. When the count CNT is N, meaning the current switching cycle must be the Nth switching cycle, step 62 of control method 60 will generate a positive result, and control method 60 proceeds to steps for a modified flyback cycle. The Nth switching cycle is deemed as a modified flyback cycle. The count CNT is reset to be 1 in the end of the Nth switching cycle.

FIGS. 6 and 7 show that only one of N consecutive switching cycles $T_{CYC}$ is a modified flyback cycle, and the rest are normal flyback cycles, but the invention is not limited to. According to embodiments of the invention, several consecutive ones of N consecutive switching cycles are modified flyback cycles and the rest are normal flyback cycles.

Taking the demonstration in FIG. 6 as an example, a difference between a normal flyback cycle and a modified flyback cycle can be found by scrutinizing the waveform of high-side signal $DRV_{HS}$ Within a normal flyback cycle, high-side signal $DRV_{HS}$ is always "0" in logic, keeping high-side switch HSS constantly turned OFF. Nevertheless, within a modified flyback cycle, even though high-side signal $DRV_{HS}$ stays most of time at "0" in logic, it becomes "1" in logic shortly about at the end of the modified flyback cycle, turning ON high-side switch HSS for a short period of time. Accordingly, a switching cycle $T_{CYC}$ for a modified flyback cycle includes high-side ON time $T_{ON-H}$, as shown by the Nth switching cycle in FIG. 6.

Since high-side switch HSS is always turned OFF within a normal flyback cycle, the energy that the leakage inductance of primary winding LP is energized during low-side ON time $T_{ON-L}$ will accumulate on capacitor CAC, so voltage $V_{CP}$ increases switching cycle by switching cycle. Each modified flyback cycle, due to the brief high-side ON time $T_{ON-H}$, could release a portion of the energy to output voltage $V_{OUT}$, to increase the conversion efficiency. At the same time, voltage $V_{CP}$ could accordingly reduce, avoiding low-side switch LSS from being damaged by an over-high voltage $V_{CP}$ that stresses low-side switch LSS when low-side switch LSS is turned OFF.

According to embodiments of the invention, an active-clamp circuit needs a bleeder resistor no more, because voltage $V_{CP}$ could decrease within a modified flyback cycle, so power conversion could be improved and manufacturing cost reduced. As demonstrated by ACF power converter 10 in FIG. 1, active-clamp circuit ACC is a no-loss active-clamp circuit because it includes no bleeder resistor.

Referring to FIG. 7, for a normal flyback cycle, step 64a, using low-side signal $DRV_{HS}$, turns ON low-side switch LSS to generate low-side ON time $T_{ON-L}$ while making signal peak $V_{CS-PEAK}$ a constant. Most of the signal waveforms during the $1^{st}$ switching cycle $T_{CYC}$ in FIG. 6, for example, are self-explanatory in light of FIG. 3B and the related teaching. Blanking time $T_{BLAN}$ starts at the same time when low-side ON time $T_{ON-L}$ starts, and has a length in response to load 13. For example, the lighter load 13 the longer blanking time $T_{BLAN}$. Within the $1^{st}$ switching cycle $T_{CYC}$, blanking time $T_{BLAN}$ covers low-side ON time $T_{ON-L}$, demagnetization time $T_{DMA}$, and a portion of oscillation time $T_{OSC}$. Terminal voltage $V_{SW}$ oscillates during oscillation time $T_{OSC}$ within the $1^{st}$ switching cycle $T_{CYC}$, producing peaks $PK_1$, $PK_2$ and valleys $VY_1$, $VY_2$ and $VY_3$.

Step 66a in FIG. 7 waits until the end of blanking time $T_{BLAN}$. FIG. 6 illustrates in the $1^{st}$ switching cycle $T_{CYC}$ that blanking time $T_{BLAN}$ ends about after the occurrence of peak $PK_2$.

Step 68 in FIG. 7 flows step 66a, detecting whether a valley of terminal voltage $V_{SW}$ happens. Step 70, following when it is determined that a valley happens, increases count CNT by 1 and concludes the current normal flyback cycle. Within the $1^{st}$ switching cycle $T_{CYC}$ in FIG. 1, for example, valley $VY_3$ appears at moment $t_{DET}$ so clock signal CLK concludes the $1^{st}$ switching cycle $T_{CYC}$, count CNT increases by 1, and the $2^{nd}$ switching cycle $T_{CYC}$ starts.

Shown in FIG. 7, steps 64b and 66b for a modified flyback cycle are the same with steps 64a and 66a respectively, and are not detailed for brevity. The Nth switching cycle $T_{CYC}$ shown in FIG. 6 is a modified flyback cycle, where blanking time $T_{BLAN}$ covers low-side ON time $T_{ON-L}$, demagnetization time $T_{DMA}$, and portion of oscillation time $T_{OSC}$. Terminal voltage $V_{SW}$ oscillates during oscillation time $T_{OSC}$ within the Nth switching cycle $T_{CYC}$, producing peaks $PK_1$, $PK_2$, $PK_3$ and valleys $VY_1$, $VY_2$ and $VY_3$ Step 72 in FIG. 7 follows step 66b, detecting whether a peak of terminal voltage $V_{SW}$ happens. Step 74, following when it is determined that a peak happens, turns ON high-side switch HSS, starting high-side ON time $T_{ON-H}$. As shown by the Nth switching cycle $T_{CYC}$ in FIG. 6, peak $PK_3$ is the $1^{st}$ peak after the end of blanking time $T_{BLAN}$, so high-side ON time $T_{ON-H}$ starts at about the moment when peak $PK_3$ appears. During high-side ON time $T_{ON-H}$, voltage $V_{CP}$ at the joint between high-side switch HSS and capacitor CAC might decrease slightly because voltage $V_{CP}$ energizes primary winding LP.

According to some embodiments of the invention, one modified flyback cycle has only one high-side ON time $T_{ON-H}$, and it appears only after the end of blanking time $T_{BLAN}$, as exemplified by FIG. 6. This invention is not limited to however. Some embodiments of the invention might have more than one high-side ON time $T_{ON-H}$ within one modified flyback cycle.

The duration of high-side ON time $T_{ON-H}$ in each modified flyback cycle might be a predetermined constant according to embodiments of the invention. But this invention is not limited to. Some embodiments of the invention may have the duration of high-side ON time $T_{ON-H}$ determined in response to voltage $V_{CP}$ at the joint between high-side switch HSS and capacitor CAC, while power controller 14 detects winding voltage $V_{AUX}$ via feedback pin FB to indirectly detect voltage $V_{CP}$. For example, if power controller 14, during high-side ON time $T_{ON-H}$, finds voltage $V_{CP}$ is below a reference value, then power controller 14 ends high-side ON time $T_{ON-H}$ in a modified flyback cycle.

Step 76 in FIG. 7, following step 74 after the end of high-side ON time $T_{ON-H}$, generates dead time $TD_F$ and then makes low-side signal $DRV_{LS}$ to turn into "1" in logic from "0" at the moment when terminal voltage $V_{SW}$ is about 0V. In other words, step 76 makes low-side switch LSS perform ZVS. Step 78 follows step 76, concluding the Nth switching cycle $T_{CYC}$, and resetting count CNT to be 1, so as to let the next switching cycle $T_{CYC}$ start.

From the embodiment shown by FIGS. 6 and 7, ACF power converter 10 acts like a quasi-resonant power converter when it is operated in a flyback mode, because a normal flyback cycle and a modified flyback cycle each ends at about the moment when a valley of terminal voltage $V_{SW}$ appears, performing valley switching that is capable of reducing switching loss. This invention is not limited to however. It is not necessary for ACF power converter 10 to perform valley switching when operated in a flyback mode. For example, some embodiments of the invention might skip step 68 in FIG. 7, and start a next switching cycle right after the end of blanking time $T_{BLAN}$.

Even though FIGS. 6 and 7 show that high-side ON time $T_{ON-H}$ in a modified flyback cycle starts at about the moment when a peak appears, but this invention is not limited to. Some embodiments of the invention might have step 72 in FIG. 7 skipped or modified. Some embodiments of the invention have step 72 modified to detect a next valley after the end of blanking time $T_{BLAN}$ and start high-side ON time $T_{ON-H}$ at about the moment when the next valley appears, for example. Other embodiments of the invention nevertheless have step 72 skipped, to start high-side ON time $T_{ON-H}$ right after the end of blanking time $T_{BLAN}$.

N is a constant integer according to embodiments of the invention, but this invention is not limited to. N might be adaptively changed in some embodiments of the invention. For example, power controller 14 could detect voltage $V_{CP}$, via the help of feedback pin FB and auxiliary winding LA, during high-side ON time $T_{ON-H}$. Voltage $V_{CP}$ is the voltage at an end of primary winding LP when high-side switch HSS is turned ON. If voltage $V_{CP}$ is higher than a top boundary of a predetermined acceptable range, N seems too large and is going to decrease by 1 at the end of the Nth switching cycle, implying the increased frequency for a modified flyback cycle to appear. On the other hand, if voltage $V_{CP}$ is lower than a bottom boundary of the predetermined acceptable range, N seems too small and is going to increase by 1 at the end of the Nth switching cycle. Accordingly, voltage $V_{CP}$ is adaptively controlled to substantially stay within the acceptable range.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method in use of a power converter using an active-clamp flyback topology, the power converter comprising an active-clamp circuit connected in parallel with a primary winding of a transformer, the active-clamp circuit comprising a high-side switch and a capacitor connected in series, the power converter further comprising a low-side switch connecting the primary winding to a first power line, the control method comprising:

switching the low-side switch to generate consecutive switching cycles including a modified flyback cycle and a normal flyback cycle;

making each of the consecutive switching cycles having a cycle time not less than a blanking time generated in response to a load of the power converter;

constantly turning the high-side switch OFF during the normal flyback cycle; and turning the high-side switch ON after the blanking time during the modified flyback cycle to perform zero-voltage switching for the low-side switch.

2. The control method as claimed in claim 1, wherein a terminal voltage at the low-side switch oscillates after a demagnetization time to generate at least one peak and one valley, the control method comprising:

detecting whether the peak appears; and turning the high-side switch ON about when the peak appears.

3. The control method as claimed in claim 1, wherein a terminal voltage at the low-side switch oscillates after a demagnetization time to generate at least one peak and one valley, the control method comprising:

detecting whether the valley appears; and turning the high-side switch ON about when the valley appears.

4. The control method as claimed in claim 1, wherein only one of the consecutive switching cycles is a modified flyback cycle.

5. The control method as claimed in claim 1, comprising:

switching the low-side switch to repeatedly generate the consecutive switching cycles.

6. The control method as claimed in claim 5, wherein the consecutive switching cycles are N in total and N is a predetermined constant.

7. The control method as claimed in claim 5, comprising:

providing a counter counting a number of the consecutive switching cycles.

8. The control method as claimed in claim 1, wherein the consecutive switching cycles are N in total and the transformer comprises an auxiliary winding, the control method comprising:

adaptively changing N to keep a voltage at an end of the primary winding substantially staying within an acceptable range.

9. The control method as claimed in claim 1, comprising:

during the modified flyback cycle, turning the high-side switch ON only after the blanking time.

10. A power converter using an active-clamp flyback topology, comprising:

a transformer with a primary winding;

a low-side switch for connecting the primary winding to a first power line;

a high-side switch connected in series with a capacitor to form an active-clamp circuit connected in parallel with the primary winding; and a control circuit, configured to control the high-side switch and the low-side switch in response to a compensation signal and a current-sense signal;

wherein the control circuit selectively operates the power converter in one of operation modes including a flyback mode;

when operated in the flyback mode, the control circuit switches the low-side switch to generate consecutive switching cycles including a normal flyback cycle and a modified flyback cycle;

during a normal flyback cycle, the control circuit constantly turns the high-side switch OFF;

during a modified flyback cycle, the control circuit turns ON the high-side switch after a blanking time to perform zero-voltage switching for the low-side switch; and the control circuit determines the blanking time in response to the compensation signal.

11. The power converter as claimed in claim 10, wherein when operated in the flyback mode, the control circuit makes the current-sense signal have a signal peak independent from the compensation signal.

12. The power converter as claimed in claim 10, wherein the consecutive switching cycles are N in total and N is a predetermined constant.

13. The power converter as claimed in claim 10, wherein the consecutive switching cycles are N in total and N is determined in response to a voltage at an end of the primary winding.

14. The power converter as claimed in claim 10, wherein a terminal voltage at the low-side switch oscillates after a demagnetization time to generate at least one peak and one valley, the control circuit detects whether the peak appears, and the control circuit turns the high-side switch ON about when the peak appears.

15. The power converter as claimed in claim 10, wherein a terminal voltage at the low-side switch oscillates after a demagnetization time to generate at least one peak and one valley, the control circuit detects whether the valley appears, and the control circuit turns the high-side switch ON about when the valley appears.

16. The power converter as claimed in claim 10, wherein the control circuit turns ON the high-side switch right after an end of the blanking time.

* * * * *